(12) United States Patent
Shah et al.

(10) Patent No.: US 10,125,050 B2
(45) Date of Patent: Nov. 13, 2018

(54) METHOD OF COATING AND PROTECTING COAL TIP BURNER WITH COLLOIDAL SILICA BASED HIGH TEMPERATURE AND ABRASION RESISTANT PUTTY

(71) Applicants: Henkel IP & Holding GmbH, Duesseldorf (DE); Henkel AG & Co. KGaA, Duesseldorf (DE)

(72) Inventors: Jayesh P. Shah, Plaistow, NH (US); Kedar Deshmukh, Pune (IN); Nippon Ghosh, Pune (IN)

(73) Assignees: Henkel IP & Holding GmbH, Duesseldorf (DE); Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/014,226

(22) Filed: Feb. 3, 2016

(65) Prior Publication Data

US 2016/0168034 A1  Jun. 16, 2016

Related U.S. Application Data

(63) Continuation of application No. PCT/US2014/050268, filed on Aug. 8, 2014.
(Continued)

(51) Int. Cl.
*B32B 15/00* (2006.01)
*C04B 35/10* (2006.01)
(Continued)

(52) U.S. Cl.
CPC .............. *C04B 35/10* (2013.01); *B32B 15/02* (2013.01); *B32B 15/043* (2013.01); *B32B 33/00* (2013.01);
(Continued)

(58) Field of Classification Search
None
See application file for complete search history.

(56) References Cited

U.S. PATENT DOCUMENTS 4,037,015 A * 7/1977 Koike ..................... C04B 28/26
                                                           106/122
4,069,075 A * 1/1978 Billing ..................... E04B 1/943
                                                           156/71
(Continued)

FOREIGN PATENT DOCUMENTS

CN 102702963 A 10/2012
EP 0440013 A2 8/1991
(Continued)

OTHER PUBLICATIONS

EP Search Report for EP Patent Application No. 14834177.9 dated Jun. 19, 2017.
(Continued)

*Primary Examiner* — Seth Dumbris
(74) *Attorney, Agent, or Firm* — James E. Piotrowski

(57) ABSTRACT

A wear resistant substrate including a metal substrate having a surface, a reinforcing support attached to the surface and cured reaction products of an inorganic curable composition disposed over and through the reinforcing support and bonded to the surface. Also a method of enhancing the wear resistance of a metal surface by attaching a reinforcing support to the surface; disposing an inorganic curable composition over and through the reinforcing support and into contact with the surface; and curing the composition.

13 Claims, 1 Drawing Sheet

Related U.S. Application Data

(60) Provisional application No. 61/863,482, filed on Aug. 8, 2013.

(51) Int. Cl.
  *B32B 33/00* (2006.01)
  *C04B 35/14* (2006.01)
  *F23D 1/00* (2006.01)
  *B32B 15/02* (2006.01)
  *B32B 15/04* (2006.01)
  *C04B 28/24* (2006.01)
  *C04B 28/26* (2006.01)
  *B32B 37/24* (2006.01)
  *B32B 38/00* (2006.01)
  *C04B 111/00* (2006.01)
  *C04B 111/10* (2006.01)

(52) U.S. Cl.
  CPC .............. *C04B 28/24* (2013.01); *C04B 28/26* (2013.01); *C04B 35/14* (2013.01); *F23D 1/00* (2013.01); *B32B 2037/243* (2013.01); *B32B 2038/0076* (2013.01); *B32B 2255/06* (2013.01); *B32B 2255/20* (2013.01); *B32B 2305/38* (2013.01); *B32B 2307/554* (2013.01); *B32B 2311/00* (2013.01); *B32B 2315/02* (2013.01); *C04B 2111/00525* (2013.01); *C04B 2111/1006* (2013.01); *F23D 2201/30* (2013.01); *Y10T 428/12347* (2015.01); *Y10T 428/12375* (2015.01); *Y10T 428/12396* (2015.01); *Y10T 428/12486* (2015.01); *Y10T 428/12597* (2015.01); *Y10T 428/12604* (2015.01); *Y10T 428/12674* (2015.01)

(56) References Cited

U.S. PATENT DOCUMENTS

| | | |
|---|---|---|
| 5,411,804 A | 5/1995 | Sugitani |
| 5,597,628 A | 1/1997 | Cetrelli et al. |
| 6,165,551 A | 12/2000 | Lukacs, III et al. |
| 2007/0197686 A1* | 8/2007 | Dinnanshteyn .......... C09D 5/18 523/179 |
| 2007/0275241 A1* | 11/2007 | Sagoecrentsil ........ C01B 33/26 428/389 |
| 2008/0050612 A1 | 2/2008 | Dry |
| 2010/0038061 A1 | 2/2010 | Olver et al. |
| 2011/0136937 A1* | 6/2011 | Wierzbicki ............ C09K 21/02 523/179 |

FOREIGN PATENT DOCUMENTS

| | | | |
|---|---|---|---|
| EP | 1260226 A1 | 11/2002 | |
| JP | S6055815 U | 4/1985 | |
| JP | H01289873 | 11/1989 | |
| JP | H06501302 A | 2/1994 | |
| JP | 2011241445 A | 12/2011 | |
| KR | 20010100260 | 11/2001 | |
| RU | 2081718 C1 | 6/1997 | |
| RU | 2258694 C1 | 8/2005 | |
| WO | WO8907181 | * 8/1989 | .............. E04B 1/94 |
| WO | 2004110951 A1 | 12/2004 | |
| WO | WO2013044798 | * 4/2013 | ................ F21S 8/02 |

OTHER PUBLICATIONS

International Search Report for International PCT Patent Application No. PCT/US2014/050268 dated Jan. 22, 2015.

Building Finishes, Wenzheng Zhou et al., China Architecture & Building Press, pp. 68-69, Dec. 1983.

Novel Functional Composite Coatings and Application Thereof, Hao Ding et al., National Defense Industry Press, pp. 115-116, Sep. 2007.

* cited by examiner

METHOD OF COATING AND PROTECTING COAL TIP BURNER WITH COLLOIDAL SILICA BASED HIGH TEMPERATURE AND ABRASION RESISTANT PUTTY

FIELD

The present disclosure relates generally to materials useful to prevent wear on surfaces subjected to abrasion, impact and high temperatures and methods of using those materials. In one embodiment the present disclosure relates to materials useful to prevent wear on coal burners and methods of using those materials.

BRIEF DESCRIPTION OF RELATED TECHNOLOGY

Thermal power plants run continuously 24 hours a day, 7 days a week burning pulverized coal in large furnaces to generate steam that drives turbines to generate electricity. Coal tip burners are primarily used to direct the pulverized coal to predetermined position in the center of the furnace. The coal is burned as a fire ball in this predetermined position. Coal tip burners are required to work continuously in a very harsh environment of high temperature and constant abrasion. Coal tip burners see continuous temperature of 700° C. to 800° C. and intermittent temperatures up to 1200° C. The pulverized coal is very abrasive and travels at 15-35 ton/hr through coal tip. The coal tip also sees occasional impact from larger pieces of coal.

These harsh conditions cause baffle plates in the coal tip burners to wear out in less than 6 months. The worn baffle plate negatively affects the pulverized coal flow into the furnace changing fire ball height and lessening efficiency. Unplanned replacement of coal tip burners is expensive as it requires shutdown of the facility. Planned replacement during a shut down is also expensive due to the size of the coal burner tip and difficulty in accessing the burner tip within the power plant.

Silica dispersion or colloidal silica and ceramic based coatings are known for their high temperature properties (>2000° C.) and are used in furnaces and kilns in steel plants and cement plants. However most of these applications are static where the coating is subjected to a high temperature environment but not impact or abrasion. Silica dispersion or colloidal silica and ceramic based coatings are inherently brittle and have poor impact resistance. Silica dispersion or colloidal silica and ceramic based coatings also have poor adhesion to metals and spall or chip off the base surface when subjected to impact of parts, etc. Despite the high temperature stability, silica dispersion or colloidal silica and ceramic based coatings are not suitable for use as a protective coating on coal tip burners as they tend to spall and break off when exposed to the continuous sliding abrasion and impact of coal particles on the coating.

Hard facing with tungsten carbide based coatings are also used for such application. However, these coatings are very expensive, require highly trained personnel using specialized equipment and application conditions and can be difficult to apply to all areas. Other methods such as plasma spraying, flame spraying, hot spraying etc. are limited due to complexity in application or limitations like coating thickness etc.

SUMMARY

The present disclosure relates generally to materials useful to prevent wear on surfaces subjected to abrasion, impact and high temperatures and methods of using those materials. In one embodiment the disclosure provides a method of forming a protective surface for a coal tip burner resistant to high temperatures, abrasion and impact. The protective surface is prepared from curable composition comprising a silica dispersion or colloidal silica used in conjunction with a reinforcing support. In one embodiment the reinforcing support is a metal mesh or screen attached to a coal tip burner baffle plate. The curable composition is applied over and through the reinforcing support. This curable composition develops very good green strength after setting at room temperature (R.T) and develops additional strength after heat curing at temperatures above room temperature. Its full strength is developed once it is fired at temperature of >800-1000° C.

It is observed that the curable composition, when applied to a cleaned steel substrate without the reinforcing support, does not have good adhesion and the cured coating delaminates easily from the substrate after a single drop from <1 meter. The combination of curable silica dispersion or colloidal silica based composition applied over a reinforcing support attached to the substrate surface and cured has good adhesion and impact resistance and withstands more than 10 drops from a height of 1-2 meter without chipping and separating from the base substrate.

The disclosed compositions include any and all isomers and steroisomers. In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

BRIEF DESCRIPTION OF THE DRAWINGS

Referring now to the drawings wherein like elements are numbered alike in the several Figures.

DETAILED DESCRIPTION

Figure 1:
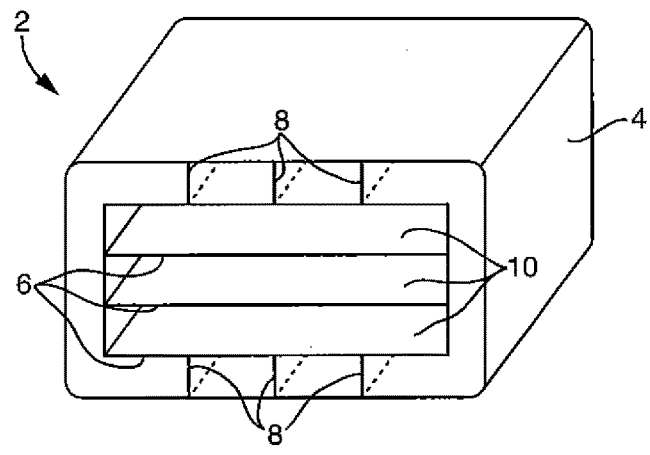
FIG. 1 is a schematic view of one embodiment of a portion of a coal tip burner.

As shown in FIG. 1, one embodiment of a coal tip burner 2 comprises an outer shell 4. A plurality of baffle plates, each 6, are disposed within the outer shell and attached thereto by a plurality of stays, each 8. The baffle plates 6 and stays 8 are generally planar metal sections. Typically the baffle plates 6 are made from stainless steel or another metal that will retain strength and abrasion resistance at the high working temperatures the coal tip burner 2 is exposed to during use. The baffle plates have wear surfaces 10 that are in contact with pulverized coal during use.

Figure 2:
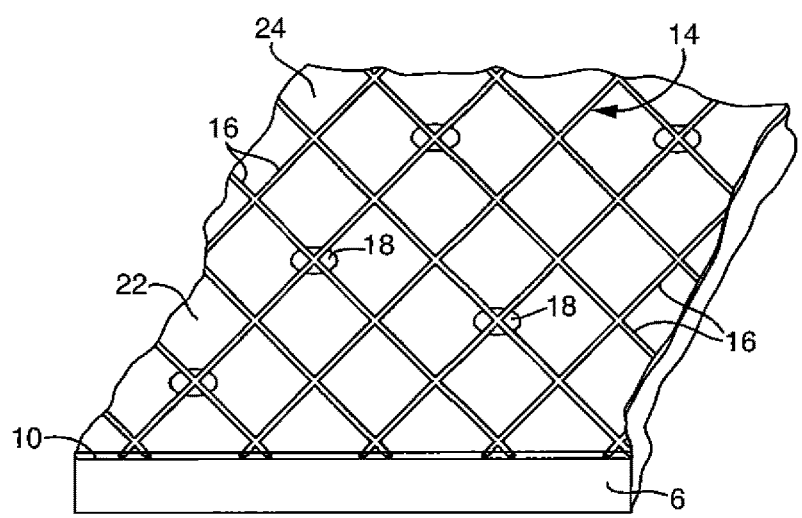
FIG. 2 is a schematic, broken away view showing a reinforcing support on a section of baffle plate with disclosed composition applied over a portion of the baffle plate and reinforcing support.

As shown in FIG. 2 a reinforcing support 14 is attached to a surface 10 of the coal tip burner 2 where enhanced abrasion resistance is desired. In one advantageous embodiment the reinforcing support 14 comprises a plurality of intersecting metal elements, each 16, such as wires that form a screen or grid or mesh. The reinforcing support 14 can be attached to surfaces 10 of the baffle plate by, for example, welding. Spot welds, each 18, of the reinforcing support 14 to the surface 10 at spaced locations have been found suitable. The reinforcing support 14 can be formed from a metal that can be welded to the surface 10. The reinforcing support material should also retain strength at the high working temperatures the coal tip burner is exposed to during use. Metals such as stainless steel have been found suitable for use as a reinforcing support 14 material.

Figure 3:
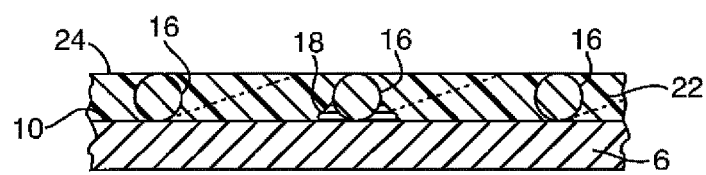
FIG. 3 is a schematic, cross sectional view of a portion of a baffle plate with attached reinforcing support and disclosed composition disposed thereon.

A silica dispersion or colloidal silica based composition 22 is disposed over the surface 10 and attached reinforcing support 14. The silica dispersion or colloidal silica based composition 22 will be a semi-fluid or paste-like or putty-like like material that can be handled using conventional techniques and equipment for such materials. The composition 22 is disposed into the spaces between the intersecting metal elements 16 and down to the surface 10. Typically the silica dispersion or colloidal silica based composition 22 will form a wear resistant surface 24, shown best in FIG. 3. Thickness of the composition 22 layer will be a function of the metal element 16 size and desired wear resistance. Cured composition 22 thicknesses of 1 mm to 10 mm, advantageously 3 mm to 6 mm over surface 10 are believed to be useful in significantly reducing wear on baffle plates 6 during use.

The silica dispersion or colloidal silica based composition 22 disposed on the surface 10 and support 14 must cure before use. The disposed composition 22 will cure at room temperature to a green or semi-hard state. The green cured composition will be a hard, monolithic mass that can no longer be applied or used. The plate 6, reinforcing support 14 and composition 22 can be handled when the composition 22 is in the green cure state. In some embodiments the composition in the green cure state has a compressive strength (ASTM D-695 at 25° C.) of 5 to 15 mPa and advantageously 10 to 15 mPa.

Exposure of the composition 22, either shortly after application or in the green cure state, to temperatures above room temperature will further increase strength of the composition 22. Raising the temperature above room temperature shortens the time required to cure the composition 22. Curing can be done by exposing the silica dispersion or colloidal silica based composition 22 disposed on the surface 10 and support 14 to room temperature for about 12 to 36 hours and advantageously about 24 hours. Alternatively, the silica dispersion or colloidal silica based composition 22 disposed on the surface 10 and support 14 can be exposed to room temperature for about 12 to 36 hours followed by exposure to a temperature above room temperature for a shorter time. An elevated temperature of 90 to 200° C. for a time of 1 to 8 hours has been found useful to increase strength. In some embodiments the composition in the fully cured (after firing at 800 ° C.) state has a compressive strength (ASTM D-695 at 25° C.) of 45 to 65 mPa and advantageously 55 to 60 mPa.

The silica dispersion or colloidal silica based composition 22 typically comprises multiple parts that must be stored separately to prevent unwanted curing. In some embodiments the silica dispersion or colloidal silica based composition 22 has three separately stored parts. In some embodiments the silica dispersion or colloidal silica based composition 22 has two separately stored parts. Just before use the multiple parts are mixed and the mixed composition 22 is applied to the reinforcing support 14 and surface 10. The mixed composition 22 can have a pot life of 10 minutes to an hour or more before it has cured to the point where it is no longer capable of being applied.

The composition 22 includes a colloidal silica part. There are many grades of colloidal silica, but all of them are composed of silica particles ranging in size from about 1 nm up to about 150 nm. These particles are typically spherical in shape, and they may be present as discrete particles or slightly structured aggregates. These particles may also be present in a narrow or wide particle size range - depending on the process by which they were created. Colloidal silica can come as a low viscosity dispersion of silica particles in fluid. The maximum weight fraction of silica in the dispersion is limited based on the average particle size. Dispersions with a smaller average diameters have larger overall specific surface areas and are limited to low concentration dispersions. Conversely, dispersions with larger average diameters have lower smaller overall specific surface areas and are available in more concentrated dispersions. The appearance of colloidal silica dispersion depends greatly on the particle size. Dispersions with small silica particles (<10 nm) are normally quite clear. Midsize dispersions (10-20 nm) start to take on an opalescent appearance as more light is scattered. Dispersions containing large colloidal silica particles (>50 nm) are normally white. Dispersion stability can also be enhanced with surface modification of the colloidal silica particles to incorporate functional groups such as silanes. The silanol groups can be isolated silanol groups or silanediol groups or vicinal types. Despite the fact that colloidal silica has the same chemical formula ($SiO_2$) as quartz or sand, colloidal silica has very different properties from larger size quartz particles and colloidal silica provides compositions with very different properties from the same composition using larger size quartz particles.

Useful colloidal silica can be a dispersion of 20-40% of 20 nanometer to 100 nanometer silica particles in a liquid phase. The liquid phase typically comprises water and materials such as surfactants to help keep the silica particles dispersed. BINDZIL 401/170 or 40/220 or CC401 colloidal silica from Akzo Nobel and AREMCO 644s colloidal silica from Aremco have been found useful in the inventive compositions.

The composition 22 includes a filler and aggregate part. This part comprises a mixture of different fillers, metal and ceramic powders and inorganic or ceramic aggregate materials. Material size for components in this part is chosen to provide a final uncured composition that can be readily applied to the support and to provide a final cured composition on the support with desired wear resistant properties. Suitable sizes range from particle sizes of 0.010 inches (500 mesh) to 0.1 inches (7 mesh). Beads or aggregate materials can be larger than 0.1 inches.

Materials useful in the filler and aggregate part include one or more of alumina powder; ceramic powder; ceramic fiber; metal powder such as steel powder or stainless steel powder; silicon carbide powder; crystalline silica powder;

ceramic beads; accicular shaped alumina powder; calcium metasilica dispersion or colloidal silica ($CaSiO_3$ or Wollastonite) powder; engineered ceramic fibers and metal oxides such as copper oxide, titanium oxide and iron oxide.

The composition 22 includes a cross-linker part. This part comprises materials that will bind the mixed composition together by reduction of pH and removal of negatively charged individual particle and or when exposed to heat. Material size for components in this part is chosen to provide a final uncured composition that can be readily applied to the support and to provide a final cured composition on the support with desired wear resistant properties. Commercially available powders are suitable. Materials useful in the cross-linker part include one or more of magnesium oxide (MgO); sodium dihydrogen orthophosphate ($Na_2HPO_4$); sodium silica fluoride ($Na_2SiF_6$); and sodium borate.

The composition 22 can optionally include a fluid. The fluid is beneficial in extending open time of the mixed compositions. Suitable fluids include water and organic liquids. Organic liquids having a boiling point above 40° C. can be used as part or all of the fluid part. The fluid part can be separate from the other parts or incorporated into one part, into more than one part or into the final mixture, for example the fluid part can be incorporated into the filler and/or aggregate part and/or the cross-linker part.

The composition 22 advantageously avoids the use of organic gelation agents such as formaldehyde, formamide, paraformaldehyde, glyoxal, methyl formate, methyl acetate, ethyl formate and ethyl acetate.

The following components, parts and compositions would be useful in the invention.

| Component | | range (pbw)[1] | preferred range (pbw) |
|---|---|---|---|
| Part A | colloidal silica part | | |
| | colloidal silica | 10-70 | 10-30 |
| Part B | fillers and aggregates | | |
| | alumina powder | 30-70 | 30-70 |
| | metal powder | 0-20 | 5-20 |
| | silicon carbide powder | 0-40 | 5-40 |
| | crystalline silica powder | | |
| | ceramic beads | 10-70 | 10-70 |
| | accicular shaped alumina (Wollastonite) powder | 0-20 | 5-20 |
| | Wollastonite powder | 0-20 | 5-20 |
| | metal oxides | 0-5 | 0.5-5 |
| Part C | cross-linker | | |
| | magnesium oxide (MgO) | 0-2 | 0.05-2 |
| | sodium dihydrogen orthophosphate ($Na_2HPO_4$) | 0-5 | 0.05-5 |
| | sodium silica fluoride ($Na_2SiF_6$) | 0-5 | 0.05-5 |
| | sodium borate | 0-3 | 0.05-3 |
| Part D | fluid part | | |
| | water, organic solvent | 0-5 | 0-3 |

[1]pbw is parts by weight

In one embodiment the composition 22 comprises separate colloidal silica, filler and aggregate, and cross linker parts and optionally a fluid part. In some embodiments one or more of the parts can be combined as long as storage stability of the mixed parts is retained. In one embodiment the composition 22 comprises separate colloidal silica, filler and aggregate and cross linker parts and the fluid part is incorporated into one of these parts. In one embodiment the composition has a first part comprising colloidal silica and a second part comprising filler and aggregate and cross linker.

Another embodiment comprises a silica part, a silicate part, a filler and aggregate part, a cross linker part and optionally a fluid part. The filler and aggregate part and the cross linker part may be combined. Addition of a silicate part advantageously provides a composition that can cure to a useful hardness with no post cure heating.

The silicate part comprises an alkaline silicate such as, for example, calcium silicate, magnesium silicate, potassium silicate and/or sodium silicate. Potassium silicate is advantageously useful.

The following table exemplifies one variation of this embodiment.

| Component | | range (pbw)[1] | preferred range (pbw) |
|---|---|---|---|
| Part A | colloidal silica part | | |
| | colloidal silica | 4-30 | 4-20 |
| Part B | silicate part | | |
| | alkaline silicate | 2-70 | 2-30 |
| Part C | fillers and aggregates and cross-linker part | | |
| | alumina powder | 30-70 | 30-70 |
| | metal powder | 0-20 | 5-20 |
| | silicon carbide powder | 0-40 | 5-40 |
| | crystalline silica powder | | |
| | ceramic beads | 10-70 | 10-40 |
| | accicular shaped alumina (Wollastonite) powder | 0-20 | 5-20 |
| | Wollastonite powder | 0-20 | 1-20 |
| | metal oxides | 0-5 | 0.05-5 |
| | magnesium oxide (MgO) | 0-2 | 0.05-2 |
| | sodium dihydrogen orthophosphate ($Na_2HPO_4$) | 0-5 | 0.05-5 |
| | sodium silica fluoride ($Na_2SiF_6$) | 0-5 | 0.05-5 |
| | sodium borate | 0-3 | 0.05-3 |
| Part D | fluid part | | |
| | water, organic solvent | 0-5 | 0-3 |

[1]pbw is parts by weight

In any embodiment the fluid part, if used, can be incorporated into one, two or all of the parts.

The separate parts are mixed shortly before use to form a final, uncured composition 22. In some advantageous embodiments the uncured composition 22 will be a pasty to putty-like material comprising about 50% to about 90% solids, advantageously 80% to 90% solids, such as 85% solids. In some advantageous embodiments the uncured composition 22 will have a specific gravity greater than 2.0 grams/cc and advantageously a specific gravity of about 2.8 grams/cc.

The mixed composition 22 is applied to the support 14 and worked through open areas between the support elements 16 to contact the baffle surface 10. The composition 22 will start curing when mixed so the time to apply the mixed composition 22 to the support 14 and surface 10 is limited.

The following examples are included for purposes of illustration so that the disclosure may be more readily understood and are in no way intended to limit the scope of the disclosure unless otherwise specifically indicated.

The following compositions 1 through 4 were prepared as shown in the following Table. All amounts are parts by weight.

| | Component | 1 | 2 | 3 | 4 |
|---|---|---|---|---|---|
| Part A | colloidal silica[1] | 30 | 22 | 22 | 20 |
| Part B | alumina powder[2] | 60 | 60 | 40 | 60 |
| | metal powder[3] | 5 | 10 | 0 | 10 |
| | silicon carbide powder | 5 | 0 | 0 | 0 |
| | ceramic beads | 20 | 20 | 20 | 20 |

-continued

| | Component | 1 | 2 | 3 | 4 |
|---|---|---|---|---|---|
| | accicular shaped alumina powder | 0 | 0 | 10 | 0 |
| | metal oxides | 0.5-1 | 0 | 0 | 0 |
| Part C | magnesium oxide[4] | 0 | .1 | 0 | 0 |
| | sodium dihydrogen orthophosphate[5] | 0 | 0 | 0.5 | 0 |
| | sodium silica fluoride[6] | 0 | 0 | 0 | 0.3 |
| | sodium borate[7] | 0 | 0.2 | 0 | 0.2 |
| total | | 121 | 112.3 | 92.8 | 110.2 |
| | open time (Minutes) | >55 | 10-15 | 30-45 | 10-20 |

[1]dispersion of 40 wt % colloidal silica (20-80 nm) in fluid
[2]Alumina powder, 325 mesh
[3]stainless steel, 325 mesh
[4]magnesium oxide powder, 98% purity
[5]sodium dihydrogen orthophosphate, 98% purity
[6]sodium silica fluoride, 98% purity
[7]sodium borate, 99% purity Open time is the elapsed time between mixing of the composition parts and curing of the mixed composition to the point it can not be readily applied to a reinforcing substrate and surface.

The following compositions were prepared as shown in the following Table. All amounts are weight %.

Cracking A composition is applied at 3 mm thickness to a 2 inch aluminum disc and allowed to cure. After full cure, if there were no visible crack then rating is 5; if there were one or two cracks then rating is 3; and if the material has more than two cracks then rating is 0.

| | 5 | 3 | 0 |
|---|---|---|---|
| Rheology | Comparable to CTR, non-sag (runny), easy mix | thicker but can be mixed | Highly thick or not mixed |

| | 5 | 3 | 0 |
|---|---|---|---|
| Cracking | No Crack | Moderate cracking | High cracking |

A four inch by four inch stainless steel panel was obtained. A reinforcing support comprising a plurality of perpendicularly arranged 1.8 mm diameter wires forming 12.8 mm squares was spot welded to a surface of the panel surface. The composition of sample 26 was disposed over the attached reinforcing support and panel surface to form a

| | Composition (wt %) | | | | | | | Ratings | | | |
|---|---|---|---|---|---|---|---|---|---|---|---|
| Sample | Colloidal silica[1] | K silicate[2] | Alumina powder[3] | Metal powder[4] | Ceramic beads[5] | Na borate[6] | Mg oxide[7] | Binder %[8] | P/B[9] | R[10] | Crack |
| 5 | 7.92 | 13.68 | 45.00 | 15.00 | 18.13 | 0.18 | 0.09 | 21.6 | 3.6 | 3 | 0 |
| 6 | 3.70 | 12.89 | 54.56 | 10.44 | 18.13 | 0.18 | 0.09 | 16.6 | 5.0 | 0 | 3 |
| 7 | 10.00 | 13.31 | 53.29 | 5.00 | 18.13 | 0.18 | 0.09 | 23.3 | 3.3 | 5 | 0 |
| 8 | 3.70 | 12.89 | 54.56 | 10.44 | 18.13 | 0.18 | 0.09 | 16.6 | 5.0 | 3 | 5 |
| 9 | 10.00 | 19.00 | 45.00 | 7.60 | 18.13 | 0.18 | 0.09 | 29.0 | 2.4 | 5 | 5 |
| 10 | 3.42 | 13.36 | 49.82 | 15.00 | 18.13 | 0.18 | 0.09 | 16.8 | 4.9 | 3 | 5 |
| 11 | 3.70 | 12.89 | 54.56 | 10.44 | 18.13 | 0.18 | 0.09 | 16.6 | 5.0 | 3 | 5 |
| 12 | 10.00 | 5.00 | 51.60 | 15.00 | 18.13 | 0.18 | 0.09 | 15.0 | 5.7 | 3 | 3 |
| 13 | 0.00 | 19.00 | 47.60 | 15.00 | 18.13 | 0.18 | 0.09 | 19.0 | 4.3 | 0 | 5 |
| 14 | 6.59 | 5.00 | 57.54 | 12.47 | 18.13 | 0.18 | 0.09 | 11.6 | 7.6 | 0 | 0 |
| 15 | 0.00 | 16.60 | 60.00 | 5.00 | 18.13 | 0.18 | 0.09 | 16.6 | 5.0 | 0 | 0 |
| 16 | 10.00 | 5.00 | 60.00 | 6.60 | 18.13 | 0.18 | 0.09 | 15.0 | 5.7 | 0 | 5 |
| 17 | 9.50 | 13.58 | 48.75 | 9.78 | 18.13 | 0.18 | 0.09 | 23.1 | 3.3 | 5 | 0 |
| 18 | 5.10 | 19.00 | 52.50 | 5.00 | 18.13 | 0.18 | 0.09 | 24.1 | 3.2 | 3 | 5 |
| 19 | 0.57 | 6.03 | 60.00 | 15.00 | 18.13 | 0.18 | 0.09 | 6.6 | 14.1 | 0 | 0 |
| 20 | 5.32 | 11.14 | 59.72 | 5.42 | 18.13 | 0.18 | 0.09 | 16.5 | 5.1 | 0 | 5 |
| 21 | 5.10 | 19.00 | 52.50 | 5.00 | 18.13 | 0.18 | 0.09 | 24.1 | 3.2 | 5 | 3 |
| 22 | 0.00 | 19.00 | 52.58 | 10.02 | 18.13 | 0.18 | 0.09 | 19.0 | 4.3 | 0 | 5 |
| 23 | 3.70 | 12.89 | 54.56 | 10.44 | 18.13 | 0.18 | 0.09 | 16.6 | 5.0 | 3 | 5 |
| 24 | 10.00 | 13.31 | 53.29 | 5.00 | 18.13 | 0.18 | 0.09 | 23.3 | 3.3 | 5 | 0 |
| 25 | 4.75 | 14.25 | 52.23 | 18.99 | 9.5 | 0.19 | 0.09 | 20.0 | 4.0 | 5 | 0 |
| 26 | 4.8 | 14.25 | 52.2 | 9.5 | 19.0 | 0.2 | 0.09 | 19 | 4.25 | | |

[1]dispersion of 40 wt % colloidal silica (20-80 nm) in fluid (Bindzil 40/170 available from Akzo Nobel).
[2]potassium silicate (Ricasil K-40 available from Ricasil Industries; Kasil-6 available from PQ Corp.).
[3]Alumina powder, 325 mesh (Tabular alumina T60 available from Almatis).
[4]stainless steel, 325 mesh (Duramet available from Washington Mills Electro Minerals Corp).
[5]Sintered alumina ceramic beads (Sintered Alumina Ceramic available from CoorsTek).
[6]sodium borate, 99% purity.
[7]magnesium oxide powder, 98% purity.
[8]Binder % is weight of (colloidal silica + K silicate)/weight of composition × 100.
[9]P/B is weight of (all fillers + all crosslinkers)/ weight of (colloidal silica + K silicate)
[10]Rheology test results.

Rating Standard:

Rheology The mixed putty is applied on a metal panel at a 5 mm thickness to assess the sag resistance, wetting and holding power. A rating of 5 is given to a composition which is creamy, easy to apply and wets properly on metal but does not sag. A rating of 3 is given to a composition that is thicker and beyond a paste consistency. A rating of 0 is given to a composition that readily crumbles and does not properly hold to the matrix.

3 to 6 mm thick layer and wear surface. The disposed composition was cured on the panel by exposure to ambient temperatures for 4 to 24 hours, followed by heating to 150° C. for 1 hour before fully curing for 12 hrs @ 800° C. The cured composition was hard to the touch and had a grey appearance. The cured composition had the following properties.

| | |
|---|---|
| weight loss after 800° C. for 24 hours | 0% |
| Rockwell hardness (ASTM D-785) | 35 HRA |
| compressive strength (ASTM D-695) | 41 MPa (@ 25° C.) |
| compressive strength (ASTM D-695) | 65 MPa (@ 250° C.) |
| compressive strength (ASTM D-695) | 80 MPa (@ 586° C.) |
| Taber abrasion H18-1000 cycles (firing sample to 400° C.) | 0% |
| Taber abrasion CS-65 (WC wheel, firing sample to 400° C.) | 0% |

Falling drop Impact resistance was tested as per ASTM D-2463 on cured examples of sample 26. The 4-lb hammer was dropped from 160 inch height on the coating w. metal reinforcement mesh prepared as described in line 38-44. The coating remain intact after five drops sustaining impact of 160 in-lbs of force. The wear surface and none of the cured composition had broken away from the plate.

Falling drop Impact resistance was tested as per ASTM D-2463 on a four inch by four inch stainless steel panel containing fully cured 3 to 6 mm thick layer of the composition of sample 26 with no reinforcing support. The comparative test panel without any reinforcement mesh failed only after one drop and cured composition shattered and came off the metal substrate.

The combination of reinforcing support and cured composition provided an impact resistant wear coating that is believed to be suitable for use with coal tip burners. The test panel with cured composition alone was substantially more fragile and not suited for use with coal tip burners.

Compositions comprising potassium silicate were surprisingly found to achieve a coating hardness suitable for use as a coal tip burner coating after drying at room temperature and without heat curing at temperatures above room temperature. Heat curing the potassium silicate comprising compositions above room temperature further increased the cured hardness. The same compositions without potassium silicate did not achieve the same coating hardness with only room temperature drying.

From the above variation of potassium silicate and colloidal silica amount, it was observed that the amount of colloidal silica has a direct impact on the flow property and the crack formation after drying. The higher binder amount (i.e lower P/B value) shows optimum performance with material rheology and reduced crack formation. Sample numbers 8, 9, 10, 11 and 21 was found to provide a very desirable balance of both the characteristics (rheology and reduced crack formation).

While preferred embodiments have been set forth for purposes of illustration, the foregoing description should not be deemed a limitation of the disclosure herein. Accordingly, various modifications, adaptations and alternatives may occur to one skilled in the art without departing from the spirit and scope of the present disclosure.

What is claimed:

1. A coal burner including a wear resistant composite, comprising:
   a metal substrate having a surface;
   a reinforcing support attached to the surface; and
   an inorganic curable composition disposed over and through the reinforcing support and contacting the surface, wherein the curable composition comprises a binder part comprising at least one of colloidal silica and alkaline silicate; a filler and aggregate part comprising at least one of alumina powder, ceramic powder, ceramic fiber, metal powder, silicon carbide powder, silica powder, ceramic bead, metasilica and metal oxides, and a cross-linker part comprising at least one of magnesium oxide (MgO), sodium dihydrogen orthophosphate ($Na_2HPO_4$), sodium silica fluoride ($Na_2SiF_6$), and sodium borate.

2. The wear resistant composite of claim 1 wherein the curable composition further comprises fluid.

3. The wear resistant composite of claim 1 wherein the reinforcing support comprises a grid of spaced metal elements.

4. The wear resistant composite of claim 1 wherein the reinforcing support comprises a metal mesh.

5. The wear resistant composite of claim 1 wherein the inorganic curable composition is cured and bonded to the surface.

6. The composition of claim 1 being devoid of organic gelation agents.

7. The composition of claim 1 being devoid of organic gelation agents selected from at least one of formaldehyde, formamide, paraformaldehyde, glyoxal, methyl formate, methyl acetate, ethyl formate and ethyl acetate.

8. A wear resistant composite, comprising:
   a metal substrate having a surface;
   a reinforcing support attached to the surface; and
   an inorganic curable composition disposed over and through the reinforcing support and contacting the surface, wherein the curable composition comprises a binder part comprising at least one of colloidal silica and alkaline silicate; a filler and aggregate part comprising alumina powder, ceramic beads larger than 0.1 inches and metal powder; and a cross-linker part comprising at least one of magnesium oxide (MqO); sodium dihydrogen orthophosphate ($Na_2HPO_4$); sodium silica fluoride ($Na_2SiF_6$); and sodium borate.

9. A method of enhancing the wear resistance of a metal surface, comprising:
   attaching the reinforcing support of claim 8 to the surface;
   disposing the inorganic curable composition of claim 8 over and through the reinforcing support and into contact with the surface; and
   curing the inorganic curable composition.

10. The wear resistant composite of claim 8 wherein the alkaline silicate is selected from at least one of calcium silicate, magnesium silicate, potassium silicate and sodium silicate.

11. The wear resistant composite of claim 8 wherein the inorganic curable composition comprises 10 to 70 parts by weight of the binder part; 40 to 245 parts by weight of the filler and aggregate part and 0.05 to 15 parts by weight of the cross-linker part.

12. The wear resistant composite of claim 8 wherein the inorganic curable composition consists of the binder part; the filler and aggregate part, the cross-linker part and optionally fluid.

13. The wear resistant composite of claim 8 wherein the inorganic curable composition is cured and bonded to the surface.

* * * * *